United States Patent [19]

Herdzina, Jr. et al.

[11] 4,140,451
[45] Feb. 20, 1979

[54] MOLDING APPARATUS

[75] Inventors: Frank J. Herdzina, Jr., Schaumburg; John J. Lasch, Crystal Lake, both of Ill.

[73] Assignee: American Can Company, Greenwich, Conn.

[21] Appl. No.: 803,768

[22] Filed: Jun. 6, 1977

[51] Int. Cl.² .............................................. B29F 1/10
[52] U.S. Cl. ................................ 425/129 R; 264/268; 425/145
[58] Field of Search ................... 425/129 R, 145, 558, 425/570, 120, 110, 146, 147; 264/268, 40.1, DIG. 60

[56] References Cited

U.S. PATENT DOCUMENTS

| | | | |
|---|---|---|---|
| 2,870,479 | 1/1959 | Wickens et al. | 425/145 X |
| 2,937,404 | 5/1960 | Wickens et al. | 425/145 X |
| 3,499,396 | 3/1970 | Kaufman, Jr. et al. | 425/145 X |
| 3,677,680 | 7/1972 | Etherington | 425/129 R |
| 3,788,561 | 1/1974 | Vilagi et al. | 264/268 |

Primary Examiner—William R. Briggs
Attorney, Agent, or Firm—Robert P. Auber; Ira S. Dorman; Harry W. Hargis, III

[57] ABSTRACT

An injection molding apparatus for forming a molded sealing ring along a peripheral region of a disk-shaped closure insert for a container. Each cavity of a plural cavity injection mold is formed to receive a disk-shaped insert to which a sealing ring is to be molded. Detection means is provided to sense the number of inserts missing from the mold, and a spring loaded pin is operative automatically to close the corresponding gate for each cavity from which an insert is missing. The detection means is operable to signal a molding compound supply means to inject into the mold only that volume of compound required for a cavity or cavities in which an insert or inserts are present.

15 Claims, 4 Drawing Figures

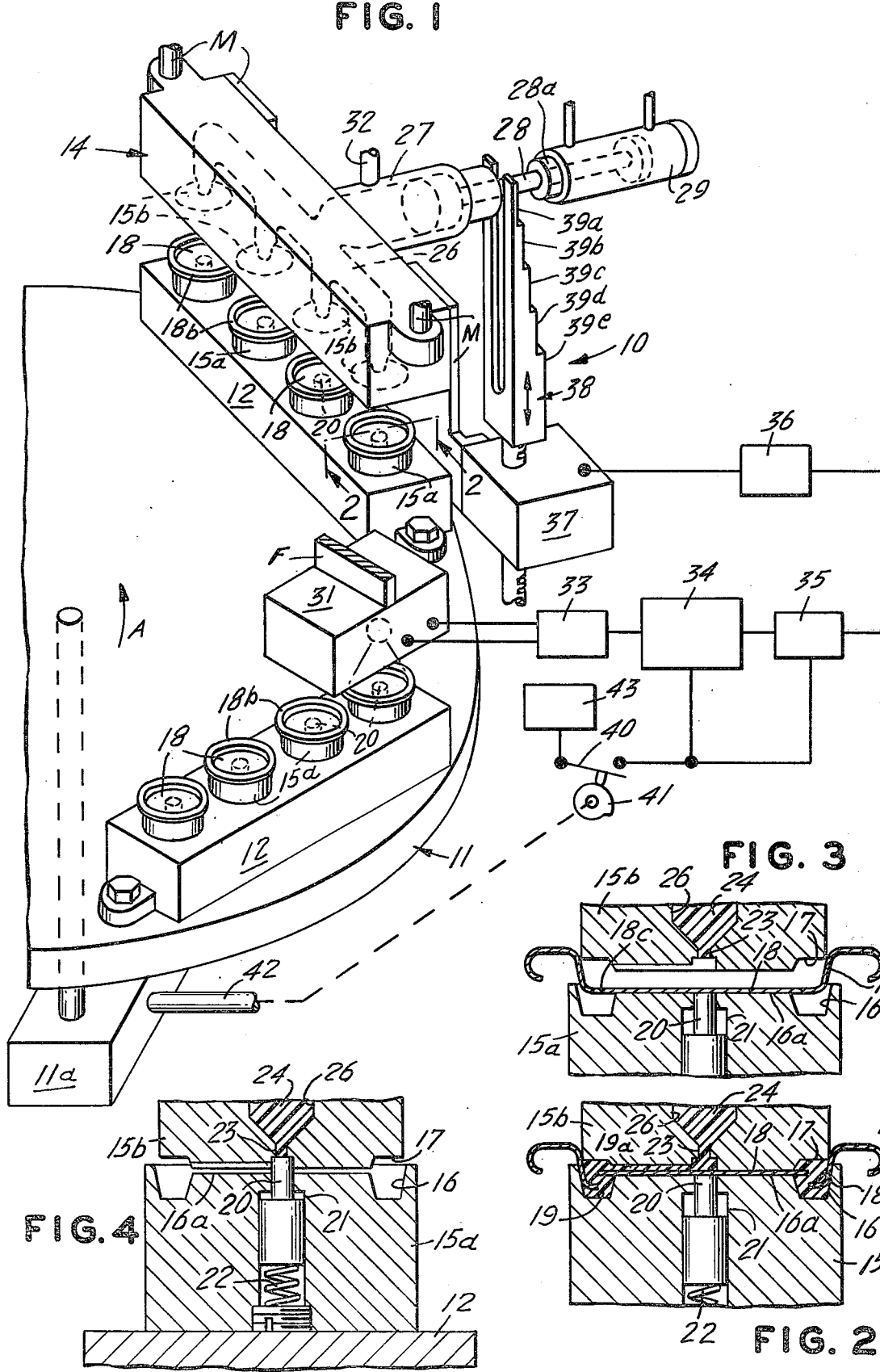

MOLDING APPARATUS

BACKGROUND OF THE INVENTION

This invention relates to molding apparatus, and more particularly to improvements in injection molding apparatus of the plural-cavity type.

In the fabrication of end closures for containers it has been a practice to form, by an injection molding operation, a closure sealing ring along a peripheral region of a metal disk insert comprising a central portion of the closure. In such a molding operation, an insert is placed in a suitably formed mold cavity followed by injection of the molding compound to form the sealing ring. Closures of this type are, of course, mass produced at relatively high rates of speed, using multiple cavity injection molding apparatus. The quantity of molding compound typically is metered according to the volume required to fill all the cavities, assuming a closure insert is present in each cavity. Malfunctions sometimes occur, however, resulting in that one or more inserts are missing from the mold. Injection of the molding compound under this condition wastes it on a cavity from which an insert is missing, and forms a defective sealing ring about any insert that is present.

It is a general objective of the invention to provide improved multiple-cavity injection molding apparatus overcoming the hereinabove stated difficulties.

It is a further and more specific objective of the invention to provide novel means for metering flow of molding compound into a multiple cavity mold according to the number of inserts present in the individual cavities.

It is a further objective of the invention to provide improved means for controlling the supply of molding compound in an injection molding apparatus.

SUMMARY OF THE INVENTION

In achievement of the foregoing as well as other objectives and advantages, the invention contemplates improved injection molding apparatus comprising: mold means including a plurality of mold cavities each having a gate through which molding compound is introduced to a corresponding cavity, each said cavity being shaped and disposed to receive an insert over which molding compound is to be formed upon its introduction into said cavity; means providing for introduction of said molding compound solely into those cavities within which inserts are disposed; and means for introducing molding compound to said mold means in an amount corresponding to the quantity required for said cavities within which inserts are disposed.

The manner in which the foregoing as well as other objectives and advantages of the invention may best be achieved will be more fully understood from a consideration of the following description taken in light of the accompanying drawing.

BRIEF DESCRIPTION OF THE DRAWING

FIG. 1 is a perspective showing of injection molding apparatus embodying the invention, with some parts broken away and others shown diagrammatically, and with mold sections in opened position and inserts in place;

FIG. 2 is a sectional view of one cavity of the molding apparatus as seen looking generally in the direction of arrows 2—2 applied to FIG. 1, and illustrating an operational feature of the invention in which the mold sections are in closed position with an insert in place; and FIGS. 3 and 4 are sectional views similar to FIG. 2, and illustrating further operational features of the invention both with and without an insert in place.

DESCRIPTION OF THE PREFERRED EMBODIMENT

With more detailed reference to the drawing, there is illustrated in FIG. 1 an injection molding apparatus 10 comprising an incrementally rotatable turret 11 supporting plural cavity lower mold sections 12. Predetermined intermittent rotational movements of the turret, in the direction of arrow A applied thereto, are afforded by stepping means 11a of known type, and sequentially register each mold section 12 with an upper, vertically movable mold section 14 mounted on suitable movable frame structure M, and shown in its upper or retracted position in provision of an opened mold.

With reference also to FIG. 2, in which the upper mold section has been moved to its full down position, in provision of a closed mold, each lower mold section 12 includes a lower cavity half 15a provided with a generally annular mold region 16 cooperably disposed with respect to an upper generally annular mold region 17, provided in an upper cavity half 15b included in upper mold section 14, to form a mold cavity. Annular mold regions 16, 17 are cooperably disposed as respects a disk-shaped insert 18 for a closure, including as elements thereof a detached rim portion 18a and a cover hook 18b, so as to provide for molding elements of the insert into a unit with a sealing ring 19. Also molded as part of ring 19 is a pull tab 19a. One such insert and sealing ring combination is disclosed and claimed in U.S. Pat. No. 3,701,453, issued Oct. 31, 1972, to John R. Platt et al., and assigned to the assignee of the present invention.

The lower mold section 12 includes a pin 20, conveniently of stepped configuration, movable in bore 21, under urging of a compression spring 22, toward gate 23 provided in the upper mold section 14 and through which gate the molding compound 24 is introduced into the cavity. As is further seen in FIG. 2, an insert 18 is in place for molding to its rim portion 18a with sealing ring 19, and pin 20 is held by the insert 18 in a retracted position, away from gate 23, to accommodate flow of the molding compound through the gate.

It is in order to explain, with reference to FIG. 3, that suitable loading means (not shown) is provided for inserts 18, and that the inserts are loaded onto lower mold section 12 with their rim portions 18a affixed by suitably weakened means such as, for example, annular score line 18c. It is the act of lowering of upper mold section 14 onto lower mold section 12 that causes the central portion 16a of the lower cavity half 15a to engage the central portion of insert 18, and, in combination with the opposing force by the upper mold cavity half 15b on rim portion 18a, shear the central portion from the rim portion while continued closure of the mold sections achieves the disposition of elements of the inserts as seen in FIG. 2.

As is illustrated in FIG. 4, an insert 18 and its rim 18a are missing, due, for example, to some malfunction in the loading operation, so that, in the lowered position of upper mold section 14 and its cavity half 15b, pin 20 is urged by its actuator spring 22 into seated position closing gate 23 and preventing flow therethrough of molding compound 24 into the mold cavity formed by cooperatively disposed annular regions 16, 17 of respective cavity halves 15a, 15b the mold sections.

With reference again to FIG. 1, molding compound 24 is supplied to the mold cavities through manifold means 26 disposed in fluid flow communication with each of the gates 23 (FIGS. 2 to 4), and is caused to flow under pressure from a plunger and cylinder assembly 27 including a plunger rod 28 driven by a fluid actuated piston and cylinder device 29 also supported on movable frame structure M by suitable means (not shown). Upon completion of a molding cycle, supply of molding compound in assembly 27 is replenished through a conduit 32 from a known suitable source (not shown).

Further to the disclosed apparatus, and as is also seen in FIG. 1, improved control means for the supply of molding compound comprises a photocell sensor 31 disposed downstream of an insert loader (not shown), as respects the direction of rotating turret 11. Sensor 31 is arranged on a fixed frame F to scan each lower cavity half 15a as a lower mold section 12 is moved past by turret 11 to place the former in registry with upper mold section 14. Sensor 31 is of a known type operative to discriminate, as by differences in reflectivity, between a lower mold cavity half 15a from which an insert 18 is absent, or missing, and such a cavity half within which an insert 18 is present. The sensor 31 has corresponding first and second outputs that are fed to a counting circuit of conventional construction as shown, including a photocontrol 33, a decade counter 34, a decoder 35, and an amplifier 36.

A stepping motor 37, mounted on the same movable frame structure M as are the upper mold section 14 and device 29, is connected for control by amplifier 36, and is operative, upon a signal from the amplifier, linearly to drive a stepped, bifurcate member 38 disposed astride a portion of plunger rod 28 and having stepped portions 39a, 39b, 39c, 39d, and 39e confronting a shoulder 28a on rod 28 and abuttingly engageable with the shoulder upon movements of rod 28 to introduce molding compound to the mold cavities. Each of the stepped portions 39a through 39e corresponds to a different plunger rod throw or displacement, each such displacement affording a different volume of compound supply in accordance with the quantity of inserts 18 in place. For example, the disposition of the thinnest stepped portion 39a for engagement by shoulder 28a affords maximum throw of plunger rod 28, as is required to supply the maximum quantity of molding compound when inserts 18 are present in all four of the mold cavities. The remaining stepped portions 39b, 39c, 39d and 39e are successively thicker in increments affording compound feed corresponding, respectively, to one missing insert, two missing inserts, three missing inserts, and four missing inserts. Should all four inserts be missing, there is no delivery of molding compound by the plunger and cylinder assembly 27 to the mold cavities.

Further to the improved control means, a reset signal source 43 is connected to decade counting circuit 34 and decoder 35 through a reset switch 40 operative by cam 41 that is rotatably driven by a shaft 42 conveniently associated with the turret stepping means 11a. Cam 41 is rotated by shaft 42 one revolution for each incremental movement of turret 11 in accommodation of a molding cycle, whereby operation of switch 40 is synchronized with the molding cycle to reset the counting circuit 34 and decoder 35 for operation anew following completion of each molding cycle. Upon each such reset operation, stepping motor 37 is energized to establish a new position of stepped, bifurcate member 38, in correspondence with the quantity of molding compound to be injected. If through successive molding cycles there are no missing inserts 18, stepped member 38 will remain in a full mold position, in which position stepped portion 39a is presented for engagement with shoulder 28a on rod 28.

In a typical operation of the molding apparatus embodying the invention, and assuming for exemplary purposes that all inserts 18 are present as illustrated in FIG. 1, photocell sensor 31 scans lower cavity halves 15a as lower mold section 12 is moved past on turret 11 through one increment of drive by stepping means 11a. Since each lower cavity half 15a is provided with an insert 18, the signal generated by sensor 31 is suitably converted by devices 33, 34, 35 and 36 to effect drive of stepping motor 37 to position stepped portion 39a in the path of shoulder 28a on plunger rod 28. As lower mold section 12 comes to rest in registry with upper mold section 14, suitable drive means for movable frame structure M is energized to lower the upper mold section 14 onto lower mold section 12, in which each of the respective upper and lower cavity sections 15b, 15a progressively assume the positions shown in FIGS. 3 and 2. While the cavity sections are in the closed position shown in FIG. 2, fluid is introduced under pressure into actuator device 29 to drive plunger rod 28 in a direction causing shoulder 28a to engage stepped portion 39a. This movement of rod 28 causes molding compound 24 to flow from supply assembly 27, in the required amount, through manifold 26, gates 23, thence into the mold cavities as seen in FIG. 2. Upon completion of molding compound introduction, the movable frame structure M is driven upwardly to retract upper mold section 14, and a subsequent stepping movement of turret 11 positions lower mold section 12 for removal of the molded inserts 18 from lower cavity halves 15a. Meanwhile the scanning and molding operations are being repeated, as described above, for the "upstream" mold sections. In the event an insert 18 is missing from a subsequent lower cavity half 15a, a suitable signal is generated by sensor 31 to effect movement of bifurcate member 38 to present stepped portion 39b for engagement with shoulder 28a. Consequently, a correspondingly lesser quantity of molding compound is delivered by supply assembly 29.

It will be appreciated that the invention affords improved means operative automatically to meter flow of molding compound into a multiple cavity mold according to the number of inserts disposed in the individual cavities, advantageously insuring production of acceptable articles for each molding cycle.

While the invention has been described with reference to a preferred embodiment, it will be apparent to one skilled in the art that various changes and modifications can be made without departing from the scope of the appended claims.

We claim:

1. Injection molding apparatus for applying molding compound to an insert positioned in a mold cavity comprising: mold means including a plurality of mold cavities each having a gate through which molding compound is introduced thereto, each said cavity being shaped and disposed to receive an insert over which molding compound is to be formed upon its introduction into said cavity;

means operable by an insert in a cavity to determine the absence of an insert from a cavity and accommodate introduction of said molding compound solely into a cavity within which an insert is disposed; means operable to determine the number of cavities within which inserts are disposed; and means operable to introduce molding compound to said mold means in an amount equal to the quantity required for the determined number of said cavities within which inserts are disposed.

2. Injection molding apparatus according to claim 1, and characterized in that said means providing for introduction of said molding compound includes normally closed compound flow stop means operative by an insert in a cavity to opened position accommodating compound flow for the recited introduction thereof.

3. Injection molding apparatus according to claim 1, and characterized further in that said means for introducing molding compound in required quantity comprises compound flow metering means operative to deliver predetermined quantities of compound in accordance with the number of cavities within which inserts are disposed, and means for determining the number of cavities in which inserts are present operative to condition said metering means to provide the required quantity of molding compound.

4. In injection molding apparatus of the type in which molding compound is introduced through gates to cavities of a plural cavity mold for formation over an insert disposed in each said cavity, the combination of: means operative to determine the absence of an insert from a cavity, means operative in the absence of an insert from a cavity to block flow of molding compound into each cavity from which an insert is absent; control means operative to determine the quantity of inserts present in the cavities; and means operative, in accordance with determination by said control means, to provide for injection into said plural cavity mold only that amount of molding compound required for a cavity in each of which there is an insert present.

5. Injection molding apparatus according to claim 4, and characterized in that said means operative to block flow of molding compound comprises closure means for a gate provided for each cavity and movable to a first position preventing inflow of molding compound to a corresponding cavity, each said closure means being movable by an insert in said cavity to a second position accommodating inflow of molding compound to said cavity.

6. In injection molding apparatus of the type in which molding compound is introduced through gates to cavities of a plural cavity mold for formation on an insert disposed in each said cavity, the combination of: means operative to determine the absence of an insert from a cavity,
  means operative to the absence of an insert from a cavity to block flow of molding compound through the corresponding gate for the cavity from which an insert is absent;
  control means operative to determine the quantity of inserts present in the cavities;
  means operative, in accordance with determination by said control means, to provide for supply to said plural cavity mold only that amount of molding compound required for the quantity of mold cavities of mold within which inserts are present, said last recited means comprising plunger means for effecting flow of molding compound to each said cavity upon operation through its stroke;
and variable stop means for said plunger means operative to establish a predetermined stroke thereof in provision for injection of molding compound corresponding to the quantity of mold cavities within which inserts are present.

7. Injection molding apparatus according to claim 6, and characterized further in that said plunger means includes a rod having a shoulder portion, and in that said variable stop means comprises a bifurcate member disposed astride said rod and includes stepped portions engageable with said shoulder portion, each of said stepped portions corresponding to a different plunger rod movement affording a volume of compound feed in accordance with the quantity of inserts in said mold cavities.

8. In injection molding apparatus of the type including a plurality of mold cavities each having a gate through which molding compound may be introduced to a corresponding cavity, each said cavity being shaped and disposed to receive an insert on which molding compound is formed upon its introduction into said cavity, and means for supplying molding compound for introduction through said gates into said cavities, the combination of: means operative to determine the absence of an insert from a cavity, means operative in the absence of a recited insert from a recited cavity to prevent introduction of molding compound from said means for supplying through a corresponding one of said gates to said cavity; and control means for effecting operation of said means for supplying molding compound to introduce molding compound through open ones of said gates into corresponding ones of said mold cavities, said molding compound being introduced in a quantity predetermined by said control means and corresponding to the amount required for cavities which have received inserts.

9. Injection molding apparatus according to claim 8, and characterized in that said means operative to prevent introduction of molding compound to a cavity in the absence of an insert comprises closure means for each said gate movable between to a first position preventing inflow of molding compound to a cavity and a second position accommodating inflow of molding compound to said cavity, said closure means being movable to said second position by an insert in said cavity.

10. Injection molding apparatus according to claim 8, and characterized in that said control means includes means for optically scanning said mold cavities for missing inserts in determination of the quantity of molding compound to be supplied.

11. Injection molding apparatus according to claim 9, and characterized in that said control means includes means for optically scanning said mold cavities for missing inserts in determination of the quantity of molding compound to be supplied.

12. Injection molding apparatus according to claim 10, and characterized in that said means operative to prevent introduction of molding compound to a cavity in the absence of an insert comprises closure means for the corresponding one of said gates movable between a first position preventing inflow of molding compound to said cavity and a second position accommodating inflow of molding compound to said cavity, said closure means being movable to said second position by an insert in the cavity.

13. In injection molding apparatus of the type including a plurality of mold cavities each having a gate through which molding compound may be introduced thereto, each said cavity being shaped and disposed to receive an insert on which molding compound is formed upon its introduction into said cavity, and means for supplying molding compound for introduction through said gates into said cavities, the combination of: means operative to determine the absence of an insert from a cavity, means operative in the absence of a recited insert from a recited cavity to prevent introduction of molding compound from said means for supplying through said gate to said cavity;

and control means for effecting operation of said means for supplying molding compound to introduce molding compound through open ones of said gates into corresponding ones of said mold cavities, said molding compound being introduced in a quantity predetermined by said control means and corresponding to the amount required for cavities which have received inserts, and characterized in that said means for supplying molding compound comprises means selectively operative to supply incremental quantities of molding compound, each such quantity corresponding to a different total amount according to the number of mold cavities in which said inserts are present, said control means being operative to determine said incremental quantity of molding compound to be supplied.

14. In injection molding apparatus of the type including a plurality of mold cavities each having a gate through which molding compound may be introduced thereto, each said cavity being shaped and disposed to receive an insert on which molding compound is formed upon its introduction into said cavity, and means for supplying molding compound for introduction through said gates into said cavities, the combination of: means operative to determine the absence of an insert from a cavity, means operative in the absence of a recited insert from a recited cavity to prevent introduction of molding compound from said means for supplying through a corresponding one of said gates to said cavity;

and control means for effecting operation of said means for supplying molding compound to introduce molding compound through open ones of said gates into corresponding ones of said mold cavities, said molding compound being introduced in a quantity predetermined by said control means and corresponding to the amount required for cavities which have received inserts, and characterized in that said means for supplying molding compound comprises plunger means for effecting flow of molding compound to said cavities upon operation thereof through its stroke, and variable stop means for said plunger means operative to establish a predetermined stroke thereof in provision of flow of a quantity of molding compound corresponding to the amount required for mold cavities within which inserts are present.

15. Injection molding apparatus according to claim 14, and characterized further in that said plunger means includes a rod having a shoulder portion, and in that said variable stop means comprises a bifurcate member disposed astride said rod and includes stepped portions engageable with said shoulder portion, each of said stepped portions corresponding to a different plunger rod movement affording a volume of compound feed in accordance with the quantity of inserts in said mold cavities.

* * * * *